United States Patent [19]

Nitschke

[11] 4,364,766

[45] Dec. 21, 1982

[54] CONTROL SYSTEM FOR MONITORING AND CONTROLLING THE PROCESSING OF GLASS SHEETS IN A GLASS PROCESSING ENVIRONMENT

[76] Inventor: John S. Nitschke, 324 E. Second, Perrysburg, Ohio 43551

[21] Appl. No.: 363,689

[22] Filed: Mar. 30, 1982

Related U.S. Application Data

[63] Continuation-in-part of Ser. No. 259,749, May 1, 1981, abandoned.

[51] Int. Cl.³ .................... C03B 35/00; G06K 1/04; G06K 1/14
[52] U.S. Cl. ........................................ 65/160; 65/163; 65/DIG. 13; 198/460; 198/461; 364/473
[58] Field of Search ........... 65/29, 160, 163, DIG. 13; 364/473; 198/460, 461, 462

[56] References Cited

U.S. PATENT DOCUMENTS

| | | | |
|---|---|---|---|
| 3,490,687 | 1/1970 | Bowman | 198/460 X |
| 3,992,182 | 11/1976 | Frank | 65/163 |
| 4,071,344 | 1/1978 | Blausey, Jr. | 65/DIG. 13 |
| 4,197,935 | 4/1980 | Arterianus et al. | 198/460 |

FOREIGN PATENT DOCUMENTS 55-2521  1/1980  Japan ..................... 198/460

*Primary Examiner*—Arthur D. Kellogg

*Attorney, Agent, or Firm*—Reising, Ethington, Barnard, Perry & Brooks

[57] ABSTRACT

A microprocessor-based control system for monitoring and controlling the processing of pairs of sheets of glass in a glass bending and tempering system. The glass sheets are conveyed by a horizontal roller conveyor which is driven by a drive motor. The roller conveyor conveys pairs of sheets of glass along the longitudinal length of an elongated heating chamber to a bending station where the glass sheets of each pair are simultaneously lifted by a bending apparatus. The glass sheets are controllably moved within the heating chamber while on a plurality of rolls adjacent the bending apparatus independent of glass sheet conveyance on the other rolls of the conveyor. The control system includes a photoelectric sensor pair mounted on the conveyor for sensing the glass sheets as the glass sheets are conveyed by the conveyor. The photoelectric sensor pair provides a glass sense signal to a control computer. An incremental encoder coupled to the output shaft of the drive motor provides a signal representation of the angular displacement of the output shaft to the control computer. The control computer is programmed to respond to the glass sense signals and a transport signal of the encoder to provide control signals to coordinate the glass bending and tempering system including the bending apparatus and a roll operator.

17 Claims, 3 Drawing Figures

CONTROL SYSTEM FOR MONITORING AND CONTROLLING THE PROCESSING OF GLASS SHEETS IN A GLASS PROCESSING ENVIRONMENT

CROSS-REFERENCE TO RELATED APPLICATIONS

This application is a continuation-in-part of application Ser. No. 259,749, now abandoned, which was filed on May 1, 1981.

The present application is related to and incorporates by reference the entire disclosure of "Roll Operator for Glass Sheet Conveyor of Bending System", U.S. Ser. No. 310,332, filed Oct. 13, 1981; and "Conveyor Controller for Glass Sheet Processing Equipment" Ser. No. 414,388 filed Sept. 1, 1982.

TECHNICAL FIELD

This invention relates to glass manufacturing apparatus and more particularly to a control system for monitoring and controlling the processing of glass sheets in a glass processing environment.

BACKGROUND ART

Bent and tempered glass is used extensively for vehicle side and rear windows to provide good resistance to breakage as well as providing an aesthetically appealing shape that complements the configuration of the vehicle openings and the overall design of the vehicle. In addition, those surfaces of a glass sheet within the viewing area must be free from mars and defects which would tend to interfere with clear vision through the window.

In order to perform the bending and tempering, the sheet glass must be heated to its deformation point of about 1050° F. to 1200° F. and then bent to the required shape before being rapidly cooled by an air spray in order to temper the glass. Tempering greatly increases the mechanical strength of the glass and its resistance to breakage as well as causing the glass to break into relatively small, dull pieces when broken instead of large slivers as in the case of untempered glass.

U.S. Pat. No. 4,282,026, issued Aug. 4, 1981, entitled "Apparatus for Bending and Tempering Glass", is related to and the entire disclosure is incorporated by reference in the present application. The patent discloses a glass transport apparatus including a furnace with a housing that defines a heating chamber in which glass is heated during conveyance along a roller hearth conveyor. An upwardly opening lower housing portion and a fixed roof of the furnace housing cooperates with vertically movable side doors to define the heating chamber. Lower ends of the doors cooperate with the upper ends of side walls on the lower housing portion to define side slots through which ends of elongated conveyor rolls project outwardly from the heating chamber. Continuous drive loops in the form of either chains or solid steel belts support the ends of the conveyor rolls and are slidably driven over external support surfaces extending alongside the slots to support and frictionally drive the rolls. A vacuum holder is positioned within the heating chamber above the conveyor rolls and has a downwardly facing inner surface with restricted openings spaced thereover. A vacuum is drawn within the restricted openings to receive the heated sheet of glass from the conveyor and support the glass above the conveyor in preparation for bending.

Prior patents disclose glass sensors which sense the position of individual glass sheets conveyed by glass transport mechanisms within a glass processing environment without requiring mechanical engagement of the glass sheets. For example, the U.S. patent of Rahrig et al. U.S. Pat. No. 3,372,016 discloses photoelectric cells in the cooling area of glass sheet tempering and conveying apparatus to sense the glass sheets. Likewise, the U.S. patent of Stickel et al., U.S. Pat. No. 3,459,529 discloses photoelectric cells within the bending area of a glass sheet bending apparatus to sense the glass sheets. As disclosed in the U.S. patent of Carson et al., U.S. Pat. No. 3,522,029, photocells are located adjacent the heating area of glass sheet reshaping apparatus to sense the glass sheets.

The previously mentioned U.S. patent entitled "Apparatus for Bending and Tempering Glass" discloses photoelectric sensors which sense moving glass sheets and which are located in a heating chamber which heats the glass sheets as they are conveyed by a conveyor therethrough.

Glass sheets moving within a glass processing environment such as a glass furnace must be accurately sensed to precisely locate the position of the glass sheets so that subsequent, automatically controlled processing and/or positioning of the glass sheets can be performed without damage to either the glass sheets or the glass processing apparatus. For example, the positions of a pair of glass sheets must be accurately known to laterally position and simultaneously pick up the pair of glass sheets from the conveyor if the conveyor operates continuously.

DISCLOSURE OF THE INVENTION

An object of the present invention is to provide an improved control system for monitoring and controlling the processing of a conveyed sheet of glass in a glass processing system which operates at relatively high production rates wherein the control system includes a signal processing means for insuring that the glass bending and tempering system bends and tempers glass sheets without damage to either the glass sheets or the bending and tempering system.

In carrying out the above objects, the control system of the invention includes sensor means located along the path of conveyance for sensing the pieces of glass as the pieces of glass are conveyed by a roller conveyor of the glass processing system. The sensor means provides a glass sense signal upon sensing each piece of glass. The control system also includes a generating means coupled to the roller conveyor for generating a transport signal corresponding to the distance that the glass sheets are conveyed along the path of conveyance. A signal processing means processes the glass sense and transport signals to provide a control signal to a roll operator of the glass processing system for operating a plurality of rolls of the roller conveyor adjacent a bending apparatus to control movement thereof and glass sheet conveyance thereon independent of the glass sheet conveyance on the other rolls of the conveyor.

A preferred embodiment of the sensor means includes a source located on one side of the glass path for emitting radiant energy transverse the path of glass conveyance and a receiver located on the opposite side of the glass path for receiving the emitted radiant energy.

Preferably, the signal processing means provides a control signal to the roll operator to enable it to first adjust a downstream piece of glass relative to its corresponding upstream piece of glass if necessary.

The sensor means is located at a predetermined position along the longitudinal length of the heating chamber downstream from a positioning station for sensing the pieces of glass as the pieces of glass are conveyed. The signal processing means is responsive to the glass sense signal of the sensor means and the transport signal to provide control signals to a bending apparatus of the system and the roll operator to enable the pick-up apparatus to pick up each sensed glass sheet without damaging either the glass sheet or the bending apparatus at the bending station.

Preferably, the signal processing means is a programmable data processor which can accept various set points from an interconnected operator console unit corresponding to various physical parameters of the glass bending and tempering system.

The advantages occurring from the use of this type of control system in this application are several. First, the amount of hardware and control instrumentation in the furnace environment is kept at a minimum, i.e. only sensor means comprising a photoelectric sensor pair and generating means comprising an incremental encoder are required to be mounted in the glass processing environment; all other control equipment of the control system including an operator console and other various control circuits can be located remotely from the furnace environment, for example, in an operator control room. Secondly, the control system affords great flexibility in this application; the position of the photoelectric sensor pair can be changed along the longitudinal length of the conveyor and, correspondingly, the set points utilized by the control system can be altered so that no alteration of the hardware is required.

The objects, features and advantages of the present invention are readily apparent from the following description of the best mode for carrying out the invention taken in connection with the accompanying drawings.

BEST MODE FOR CARRYING OUT THE INVENTION

Figure 1:
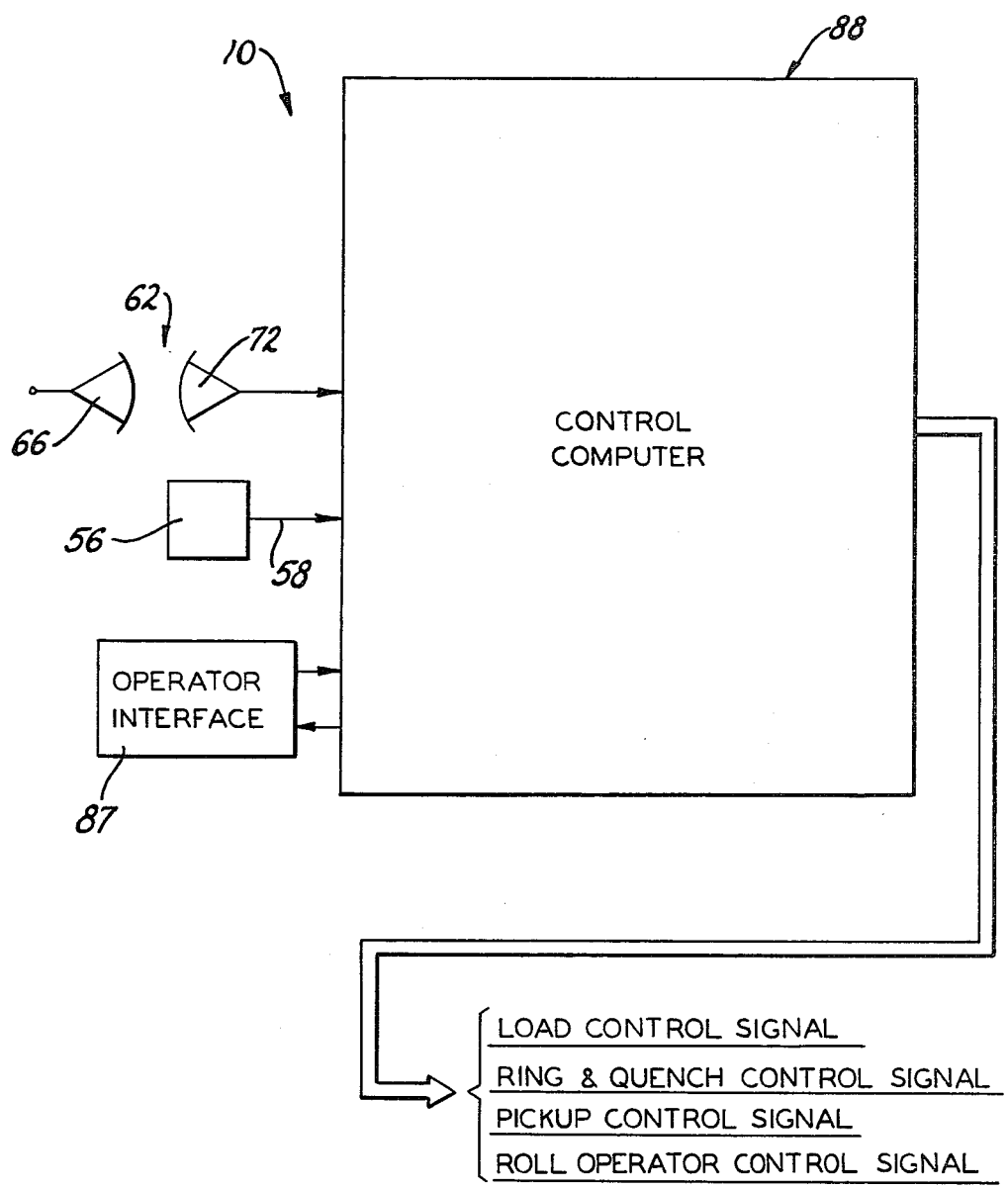
FIG. 1 is a schematic representation of a control system of the present invention in conjunction with a glass bending and tempering system.
Figure 2:
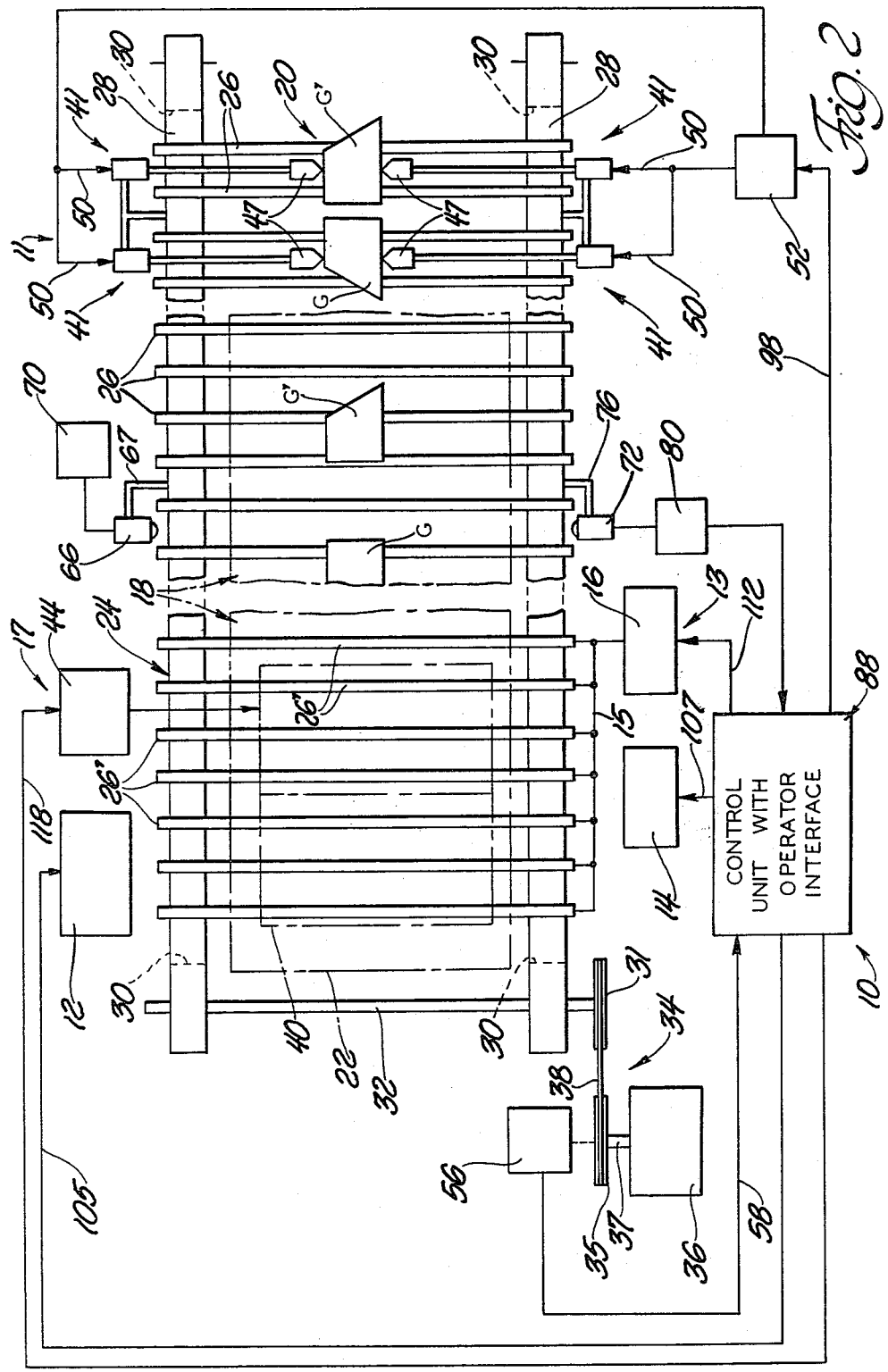
FIG. 2 is a top plan schematic view of the control system in conjunction with the glass bending and tempering system.
Figure 3:
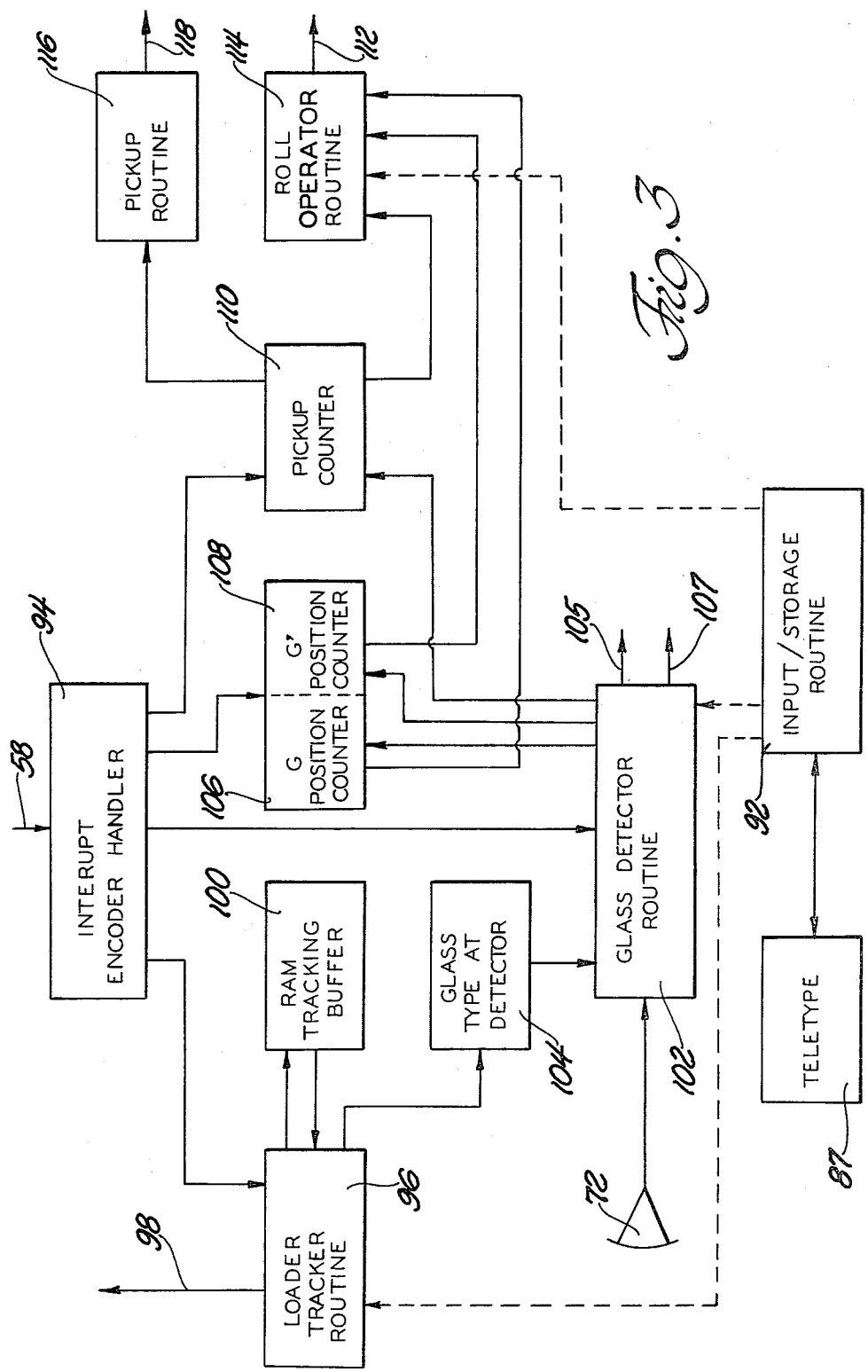
FIG. 3 is a representation of the control program followed by the control system.

Referring to FIGS. 1 and 2 of the drawings, there is collectively indicated at 10 a control system constructed according to the present invention for monitoring the position of a sheet of glass and for controlling glass processing machinery such as a glass loading apparatus 11, a roll operator 13, glass bending apparatus, and a pair of glass bending rings and quench units 12 and 14. The glass conveying apparatus may comprise a roll shifter or a roll positioning drive, both of which are of the general types disclosed in co-pending application entitled "Roll Operator for Glass Sheet Conveyor of Bending System", U.S. Ser. No. 310,332, filed on Oct. 13, 1981. When the roll operator 13 takes the form of the roll shifter, the roll shifter generally includes a roll connector (15) and an associated actuator (16) that moves the roll connector in order to shift the rolls 26', which are shiftable in this form.

When the roll operator 13 takes the form of the roll positioning drive, the roll positioning drive generally includes continuous drive loops (15) and an associated drive mechanism (16) which drives the drive loops (15) in order to rotate the rolls 26' in this form.

As described in the application noted immediately above, the operation of the roll operator 13 as controlled by the control system 10 substantially reduces relative movement between a pair of glass sheets G and G' upon being received by the glass bending apparatus while conveyance of the glass sheets with respect to the conveyor is continuous in order to prevent roll marking. Repositioning of the leading and trailing glass sheets G and G', respectively, with respect to each other in preparation for simultaneous bending can also be performed by shifting the leading glass sheet G with respect to the trailing glass sheet G'.

The glass bending apparatus may comprise a bending apparatus 17 which is of the general type disclosed in U.S. patent entitled "Apparatus for Bending and Tempering Glass", U.S. Pat. No. 4,282,026, issued on Aug. 4, 1981.

Such glass processing machinery includes a furnace 18. The furnace 18 receives discrete sheets of glass to be bent and tempered at a loading station 20. The furnace 18 has provisions for bending the glass at a bending station 22 once it is heated in a manner that is described in the above-referenced patent entitled "Apparatus for Bending and Tempering Glass".

A conveyor of the machinery is indicated generally by reference numeral 24 and includes a plurality of conveyor rolls 26 of fused silica particles that are sinter bonded to each other. Continuous drive loops 28 in the form of chains or solid steel belts are trained over pulleys 30. At one end of the conveyor 24 a cross-shaft 32 connects the pulleys 30 with a driven pulley 31. A drive mechanism 34 drives the pulleys 30 by a digital drive motor such as a D.C. motor 36 which has a pulley 35 mounted on its shaft 37 which drives a chain 38 trained thereover and over the pulley 31 to pull the drive loops 28 over support surfaces and thereby frictionally drive the ends of the rolls 26.

As seen in FIG. 2, a vacuum holder 40 of the apparatus 17 is positioned within the furnace heating chamber at the bending station 22. The vacuum holder 40 which is more fully described in the above-referenced patent "Apparatus for Bending and Tempering Glass", receives sheets of glass, two at a time, at the glass pick-up or bending station by use of a vacuum. The vacuum holder 40 is alternately raised or lowered by a holder lift unit 44 of the glass pick-up apparatus 17 which, in turn, may be of the general type as that disclosed in the patent entitled "Apparatus for Bending and Tempering Glass".

The loading apparatus 11 generally includes loaders 41 for supporting a pair of glass sheets G and G' above the horizontal conveyor 24 prior to dropping the sheets G and G' onto the conveyor 24. Each loader 41 includes a housing 47 with a support (not shown) mounted thereon for movement from an extended position where the glass sheets G and G' are supported to a retracted position in order to drop the glass sheets G and G' onto the conveyor 24. An actuator (not shown) of each support is air actuated along lines 50 from a compressed air source 52 which, in turn, is actuated by the control system 10.

The preferred form of the control system 10 includes a commercially available incremental encoder 56 mounted on the shaft 37 of the motor 36 to sense the angular displacement of the shaft 37. The incremental encoder 56 is able to withstand the normally high operating temperatures of the furnace environment. Encoders employing semi-conductive components are generally unsuited due to the high temperature furnace environment.

The incremental encoder 56 emits a transport signal in the form of a shaft position signal along line 58. The incremental encoder 56 emits the shaft position signal in the form of a pulse every time the shaft 37 of the motor 36 rotates enough so as to move the glass sheet, for example, 0.01 inches.

The shaft position signal from the incremental encoder 56 is received by a preprogrammed control computer or control unit 88. The control computer 88 uses the shaft position signal as an interrupt request signal to decrement various timing counters within its RAM memory upon motion of the conveyor 24. More specifically, when the control computer 88 receives the shaft position signal for the encoder 56 indicating forward movement of the conveyor 24, various timing counters in the control computer 88 are counted down or decremented. Other functions and operations of the control computer 88 are described hereinbelow.

The control system 10 also includes a photoelectrical sensor pair 62. The sensor pair 62 includes an energy emitting source unit 66 which is electrically connected to a power supply 70 to emit radiant electromagnetic energy in the form of modulated beams of infrared energy and which is removably mounted on one side of the conveyor 24 by a mounting assembly 67. The sensor pair 62 also includes an energy receiving unit 72 which is adapted to receive and respond to a threshold, predetermined level of modulated infrared energy emitted by the source unit 66 and which is removably mounted on the opposite side of the conveyor 24 by mounting assembly 76. If the modulated infrared energy received by the receiver unit 72 is less than the predetermined level, a glass sense signal is provided by the receiver unit 72. The signal provided by the receiver unit 72 is subsequently demodulated by a demodulator 80 for input to the control computer 88 in a form which the control computer 88 can understand. The receiver unit 72 includes a phototransistor adapted to receive and respond to the modulated infrared energy emitted by the source unit 66. The source unit 66 includes a photodiode which emits the modulated infrared energy received by the receiver unit 72.

Photodiodes and phototransistors which use modulated infrared energy are especially suited for sensing glass in a glass processing environment. For example, such a phototransistor is not responsive to extraneous infrared energy. Such infrared energy is emitted by the sun, light bulbs and other heat sources such as the furnace 18.

The operator interface or console in the form of a teletype unit 87 inputs into the control computer 88: a first set of numerical data corresponding to the longitudinal distance between the photoelectrical sensor 72 and the position on the rolls 26' at which the glass sheets can be independently controlled through operation of the roll operator 13; a second set of numerical data corresponding to the longitudinal distance between the photoelectric sensor 72 and a bending location for the downstream piece of glass (ie. where the glass bending apparatus 17 lifts or removes the downstream piece of glass from the conveyor 24); and a third set of numerical data corresponding to the required distance between a pair of glass sheets G and G' at both the loading station 20 and at the bending location.

As previously mentioned an operator first initializes the control system by placing various set points in the control unit 88 via the teletypewriter or teletype 87. Information or data entered near the teletype 87 is accepted by a block 92 which comprises an input/storage routine. The software represented by the block 92 accepts information from the teletype 87 such as: the first set of numerical data; the distance between the loads of glass as they are initially placed onto the conveyor 25 by the loader 11; the distance from the receiving unit 72 to the bending position of the bending apparatus 17; and the desired amount of distance between pairs of sheets of glass.

After the operator has loaded this data into the control and the conveyor 24 begins operations, output from the encoder 56 appears on line 58 and is handled by an interrupt encoder handler at block 94. The interrupt encoder handler 94 first initializes various counters in the software by resetting the counters. When the transport signal from the encoder 56 is sensed along the line 58, control is automatically switched to the interrupt encoder handler 94 and all counters connected to the interrupt encoder handler 94 are decremented for each encoder pulse received on line 58. After all the counters connected to the interrupt decoder handler are decremented, control is returned to the interrupted routine of the software.

In block 96, a loader/tracker routine sends a load control signal along line 98 to the loader 11 after the conveyor 24 has moved the distance set by the operator as previously described. The set amount is stored in a RAM memory (not shown) and is read out of the RAM memory and placed into a counter (not shown) in the block 96 to be decremented by the interrupt encoder handler 94 after each pair of glass sheets, G and G', is dropped onto the conveyor 24.

At the same time that the loader 11 is sent its load control signal, the loader/tracker routine 96 places a flag in a RAM tracking buffer 100. The RAM tracking buffer 100 comprises a FIFO buffer (i.e. first in, first out) which also indicates therein whether a pair of dropped glass sheets G and G' are to be bent by the first glass bending ring and quench unit 12 or the second glass bending ring and quench unit 14. At the same time the flag is entered into the RAM tracking buffer 100 by the loader/tracker routine 96, any old flags which might have been in the RAM tracking buffer 100 are removed.

The loader/tracker routine 96 thereafter continues to load pairs of glass sheets G and G' by controlling the loader 11 and each loaded pair of glass sheets G and G' are accounted for in the RAM tracking buffer 100.

After the first downstream glass sheet G is sensed by the receiving unit 72, a glass sense signal is emitted by the receiving unit 72 and is received by a glass detector routine 102. Preferably, the glass detector routine 102 includes a software filter to determine whether the unit 72 is blocked from receiving the infrared energy for a predetermined number of inches of conveyor motion in order to ensure that the unit 72 is not blocked from receiving the infrared energy by an undersized piece of glass or other object. Also the glass detector routine 102 includes a software filter to determine whether the unit 72 received the infrared energy for at least a predetermined number of inches before the beam of infrared energy is again interrupted by the upstream piece of glass G' or another object. In this way, if the glass sheet G encounters a bump, thereby temporarily allowing the infrared energy to be received by the unit 72, the signal will not be misinterpreted by the control unit 88 to mean that the upstream sheet of glass G' is immediately following the downsteam sheet of glass G.

After the glass detector routine 102 has determined that it has detected a load of glass, the flag relating to that pair of glass sheets is removed from the RAM tracking buffer 100 via the loader tracker routine 96. A glass type detector routine 104 indicates to the glass detector routine 102 whether the pair of glass sheets is to be bent by the first glass bending ring and quench unit 12 or the second bending ring and quench unit 14.

The glass detector routine 102 sends out a ring and quench control signal to either one of the first or second glass bending ring and quench units 12 and 14 after it has determined from the flag set in the RAM tracking buffer which one of the units 12 and 14 is to perform the bending operation. A control signal is sent out on either one of lines 105 or 107 depending on which one of the units 12 and 14, respectively, is selected.

After the glass detector routine 102 has determined that the downstream piece of glass G has been detected, the glass detector routine 102 sets a G position counter 106 to accurately track the downstream part. The glass detector routine 102 puts this same information in a G' position counter 108 when the glass detector routine 102 has determined that the piece of glass G' has been detected. Also, after the upstream piece of glass G' has been detected by the glass detector routine 102, the glass detector routine 102 places a distance from the unit 62 to that portion of the vacuum holder 40 which picks up the upstream position of glass G' in a pick-up counter 110.

When the position counters have tracked the glass sheets to a position where the downstream sheet G is on the rolls 26' while upstream part G' is approaching but not yet on the rolls 26', a spacing correction is calculated by a roll operator routine 114. This is done by comparing the actual spacing between the sheets of glass from position counters G and G' with a setpoint number previously entered by the teletype. A suitable control signal is emitted on line 112 from the roll operator routine 114. The control signal actuates the roll operator 13 to operate the rolls 26' to correct the spacing between the parts G and G'.

When both parts G and G' are on the rolls 26' the roll operator routine 114 emits a suitable second control signal on line 112. This signal causes the roll operator 13 to operate the rolls 26' in preparation for a slowdown stroke cycle. The pick-up counter 110 is corrected to reflect the distance the glass is moved by this pre-slowdown stroke.

When the pick-up counter 110 has been counted down to zero, a pick-up routine 116 emits a pick-up or removal control signal along line 118 to the holder lift unit 44. At the same time the pick-up counter 110 counts down to zero, the roll operator routine 114 emits a third control signal along line 112 to the roll operator 13 to cause the rolls 26' to move the glass sheets upstream as shown in FIG. 2 at a reduced conveyor speed to thereby substantially reduce relative movement between the glass sheets G and G' upon being received by the vacuum holder 40 in order to prevent glass marking and also to reduce wear on the vacuum holders 40 as described in greater detail in the prior mentioned patent application entitled "Roll Operator for Glass Sheet Conveyor of Bending System".

After the slowdown cycle when the glass sheets G and G' have been picked up but before the next load arrives on the rolls 26', the roll operator routine 114 emits a fourth control signal on line 112 to cause the roll operator 13 to move the rolls 26' to the midpoint "home" position in prepartion for another cycle when the roll operator 13 takes the form of the roll shifter.

In this way the control system 10 coordinates the operation of the glass processing machinery including the glass loading apparatus 11, the roll operator 13, the bending apparatus 17 and the glass bending ring and quench units 12 and 14 by monitoring and controlling the processing of the glass sheets G and G' to a high degree of accuracy.

In summary, the present invention affords important advantages over alternative control systems. The first advantage lies in the fact that only a limited number of components are situated and operated within the furnace environment. Most of the control hardware is located remotely from the furnace environment, for example, in a process control room. The second advantage lies in the flexibility of the present control system in this application. Specifically, sensor pair 62 can be repositioned along the longitudinal length of the conveyor 24 and the control system 10 may still work without requiring extensive changes to the hardware. Also, the positions of the loading station along the longitudinal length of the conveyor 24 may be changed without extensive changes to the hardware. The third advantage lies in the ability of the control system of the present invention to accurately monitor the positions of pairs of glass sheets on the conveyor 24 so that the conveyor 24 need not be stopped in order to pick up the glass sheets therefrom.

The invention has been described in an illustrated manner and it is to be understood that the terminology which has been used is intended to be in the nature of words of description rather than of limitation. Many modifications and variations of the present invention are possible in light of the above teachings. It is therefore to be understood that within the scope of the appended claims, the invention may be practiced otherwise than as specifically described.

What is claimed is:

1. A control system for monitoring and controlling the processing of sheets of glass in a glass processing system wherein the glass sheets are conveyed by a horizontal roller conveyor and received from certain rolls of the roller conveyor by a bending apparatus of the glass processing system to perform bending thereof, the control system including sensor means located along the path of conveyance for sensing the glass sheets as the glass sheets are conveyed by the roller conveyor past the sensor means and providing glass sense signals upon sensing the glass sheets; and generating means coupled to the roller conveyor for generating a transport signal corresponding to the distance that the glass sheets are conveyed along the path of conveyance; wherein the improvement comprises:

programmable signal processing means for processing said glass sense and transport signals corresponding to each glass sheet to provide control signals to a roll operator of the glass processing system for operating a plurality of rolls adjacent the bending apparatus to control movement thereof and glass sheet conveyance thereon independent of the glass sheet conveyance on the other rolls of the conveyor.

2. A control system for monitoring and controlling the processing of sheets of glass in a glass processing system wherein the glass sheets are conveyed by driven rolls of a horizontal roller conveyor and vertically removed from certain rolls of the roller conveyor of a bending apparatus of the glass processing system to perform bending thereon, the control system including sensor means located along the path of conveyance for sensing the glass sheets as the glass sheets are conveyed by the roller conveyor past the sensor means and providing a glass sense signal upon sensing the glass sheets; and generating means coupled to the roller conveyor for generating a transport signal corresponding to the distance that the glass sheets are conveyed along the path of conveyance; and wherein the improvement comprises:

signal processing means for processing said glass sense and transport signals corresponding to each glass sheet to provide control signals to the bending apparatus and a roll operator of the glass processing system for operating a plurality of rolls adjacent the bending apparatus to control the bending apparatus to remove each glass sheet from the adjacent rolls wherein relative horizontal movement between each of the glass sheets and the bending apparatus has been substantially reduced.

3. A control system for monitoring and controlling the relative positions of pairs of sheets of glass in a glass bending and tempering system of the type wherein each pair of glass sheets are conveyed by the driven rolls of a horizontal roller conveyor and removed from certain rolls of the roller conveyor by a bending apparatus, the roller conveyor conveying each pair of glass sheets along the longitudinal length of an elongated heating chamber to a bending station where each pair of glass sheets is lifted by the bending apparatus, the control system including sensor means located at a predetermined position along the longitudinal length of the heating chamber for sensing a piece of glass as the piece of glass is conveyed by the conveyor and providing a glass sense signal and generating means coupled to the roller conveyor for generating a signal corresponding to the distance that the glass sheet is conveyed along the path of conveyance, wherein the improvement comprises:

programmable signal processing means for processing said glass sense and transport signals corresponding to each glass sheet to provide a control signal to a roll operator of the glass bending and tempering system for operating a plurality of rolls adjacent the bending apparatus to control movement thereof and glass sheet conveyance thereon wherein the downstream glass sheet of a certain pair of glass sheets is supported on the adjacent rolls to thereby move the downstream glass sheets to a desired position relative to the upstream glass sheet and independant of the glass sheet conveyance on the other rolls of the conveyor to ensure proper pick-up of the pair of glass sheets.

4. The control system as claimed in claims 1, or 2, or 3 wherein said sensor means includes an energy emitting source located on one side of the path of conveyance and an energy receiving receiver located on the opposite side the path of conveyance to receive the emitted energy, said receiver providing the glass sense signal, the sheets of glass interrupting the reception of energy by the receiver.

5. The control system as claimed in claim 1, or claim 2, or claim 3 wherein said generating means comprises encoder means associated with the output shaft of a drive motor of the roller conveyor for providing a signal representation of the angular displacement of the output shaft.

6. A control system for monitoring and controlling the processing of sheets of glass in a glass processing system wherein the glass sheets are conveyed by a roller conveyor system and received from certain rolls of the roller conveyor system, the control system including sensor means located along the path of conveyance for sensing the glass sheets as the glass sheets are conveyed by the roller conveyor system past the sensor means and providing glass sense signals upon sensing the glass sheets; and generating means coupled to the roller conveyor system for generating a transport signal corresponding to the distance that the glass sheets are conveyed along the path of conveyance; wherein the improvement comprises:

programmable signal processing means for processing said glass sense and transport signals corresponding to each glass sheet to provide control signals to a roll operator for operating the certain rolls to control movement thereof and glass sheet conveyance thereon independent of the glass sheet conveyance on the other rolls of the roller conveyor system.

7. A control system for monitoring and controlling the processing of sheets of glass in a glass processing system wherein the glass sheets are conveyed by driven rolls of a roller conveyor system and transferred from certain rolls of the roller conveyor system by transfer apparatus of the glass processing system in preparation for further processing of the glass sheets, the control system including sensor means located along the path of conveyance for sensing the glass sheets as the glass sheets are conveyed by the roller conveyor system past the sensor means and providing a glass sense signal upon sensing the glass sheets; and generating means coupled to the roller conveyor system for generating a transport signal corresponding to the distance that the glass sheets are conveyed along the path of conveyance; and wherein the improvement comprises:

signal processing means for processing said glass sense and transport signals corresponding to each glass sheet to provide control signals to the transfer apparatus and a roll operator for operating the certain rolls and to the transfer apparatus to transfer each glass sheet from the certain rolls without slippage of the glass sheets on the certain rolls.

8. A control system for monitoring and controlling the relative positions of sheets of glass in a glass tempering system of the type wherein each glass sheet is conveyed by the driven rolls of a roller conveyor system and transferred from certain rolls of the roller conveyor system by transfer apparatus of the glass tempering system, the roller conveyor system conveying the glass sheets along the longitudinal length of an elongated heating chamber to a transfer station where the glass sheets are transferred by the transfer apparatus, the control system including sensor means located at a predetermined position along the longitudinal length of the roller conveyor system for sensing a piece of glass as the piece of glass is conveyed by the roller conveyor system and providing a glass sense signal and generating means coupled to the roller conveyor system for generating a signal corresponding to the distance that the glass sheet is conveyed along the path of conveyance, wherein the improvement comprises:

programmable signal processing means for processing said glass sense and transport signals corresponding to each glass sheet to provide a control signal to a roll operator of the glass tempering system for operating the certain rolls to control movement thereof and glass sheet conveyance thereon wherein a downstream glass sheet of a certain pair of glass sheets is supported on the certain rolls to thereby move the downstream glass sheet to a desired position relative to an upstream glass sheet and independent of the glass sheet conveyance on the other rolls of the roller conveyor system to ensure proper transfer of the pair of glass sheets by the transfer apparatus.

9. The control system as claimed in claims 6, or 7 or 8 wherein said sensor means includes an energy emitting source located on one side of the path of conveyance and an energy receiving receiver located on the opposite side of the path of conveyance to receive the emitted energy, said receiver providing the glass sense signal, the sheets of glass interrupting the reception of energy by the receiver.

10. The control system as claimed in claim 1, or claim 2, or claim 3, or claim 6, or claim 7, or claim 8 wherein said generating means comprises encoder means associated with the output shaft of a drive motor of the roller conveyor system for providing a signal representation of the angular displacement of the output shaft.

11. The control system as claimed in claim 6, or claim 7, or claim 8 including means for entering and storing data in said signal processing means related to the processing of the glass sheets.

12. A control system for monitoring and controlling the processing of sheets of glass in a glass processing system wherein the glass sheets are first loaded onto a roller conveyor system by a loading apparatus of the processing system and then conveyed by the roller conveyor system and received from certain rolls of the roller conveyor system, the control system including sensor means located along the path of conveyance for sensing the glass sheets as the glass sheets are conveyed by the roller conveyor system past the sensor means and providing glass sense signals upon sensing the glass sheets; and generating means coupled to the roller conveyor system for generating a transport signal corresponding to the distance that the glass sheets are conveyed along the path of conveyance; wherein the improvement comprises:

programmable signal processing means for processing said glass sense and transport signals corresponding to each glass sheet to provide control signals to the loading apparatus for consecutively loading the glass sheets onto the roller conveyor system, to a roll operator for operating the certain rolls to control movement thereof and glass sheet conveyance thereon independent of the glass sheet conveyance on the other rolls of the roller conveyor system.

13. A control system for monitoring and controlling the processing of sheets of glass in a glass processing system wherein the glass sheets are first loaded onto a roller conveyor system by a loading apparatus of the processing system and then conveyed by driven rolls of the roller conveyor system and transferred from certain rolls of the roller conveyor system by transfer apparatus of the glass processing system in preparation for further processing of the glass sheets, the control system including sensor means located along the path of conveyance for sensing the glass sheets as the glass sheets are conveyed by the roller conveyor system past the sensor means and providing a glass sense signal upon sensing the glass sheets, and generating means coupled to the roller conveyor system for generating a transport signal corresponding to the distance that the glass sheets are conveyed along the path of conveyance; and wherein the improvement comprises:

signal processing means for processing said glass sense and transport signals corresponding to each glass sheet to provide control signals to the loading apparatus for consecutively loading the glass sheets onto the roller conveyor system, to a roll operator for operating the certain rolls and to the transfer apparatus to transfer each glass sheet from the certain rolls without slippage of the glass sheets on the certain rolls.

14. A control system for monitoring and controlling the relative positions of sheets of glass in a glass tempering system of the type wherein each glass sheet is first loaded onto a roller conveyor system by a loading apparatus of the processing system and then conveyed by the driven rolls of the roller conveyor system and transferred from certain rolls of the roller conveyor system by transfer apparatus of the glass tempering system, the roller conveyor system conveying the glass sheet along the longitudinal length of an elongated heating chamber to a transfer station where the glass sheets are transferred by the transfer apparatus, the control system including sensor means located at a predetermined position along the longitudinal length of the roller conveyor system for sensing a piece of glass as the piece of glass is conveyed by the roller conveyor system and providing a glass sense signal and generating means coupled to the roller conveyor system for generating a signal corresponding to the distance that the glass sheet is conveyed along the path of conveyance, wherein the improvement comprises:

programmable signal processing means for processing said glass sense and transport signals corresponding to each glass sheet to provide control signals to the loading apparatus for consecutively loading the glass sheets onto the roller conveyor system and to a roll operator of the glass tempering system for operating the certain rolls to control movement thereof and glass sheet conveyance thereon wherein a downstream glass sheet of a certain pair of glass sheets is supported on the certain rolls to thereby move the downstream glass sheet to a desired position relative to an upstream glass sheet and independent of the glass sheet conveyance on the other rolls of the roller conveyor system to ensure proper transfer of the pair of glass sheets by the transfer apparatus.

15. The control system as claimed in claims 12, or 13, or 14 wherein said sensor means includes an energy emitting source located on one side of the path of conveyance and an energy receiving receiver located on the opposite side of the path of conveyance to receive the emitted energy, said receiver providing the glass sense signal, the sheets of glass interrupting the reception of energy by the receiver.

16. The control system as claimed in claim 12, or claim 13, or claim 14 wherein said generating means comprises encoder means associated with the output shaft of a drive motor of the roller conveyor for providing a signal representation of the angular displacement of the output shaft.

17. The control system as claimed in claim 12, or claim 13, or claim 14 including means for entering and storing data in said signal processing means related to the processing of the glass sheets.

* * * * *